(12) United States Patent
Newberg (10) Patent No.: US 7,209,047 B2
(45) Date of Patent: Apr. 24, 2007

(54) MONITORING COUPLING STATUS WITH PROCESS LOCKOUT FEEDBACK

(75) Inventor: Douglas A. Newberg, Plainsboro, NJ (US)

(73) Assignee: Pharmenta Inc., Princeton, NJ (US)

( * ) Notice: Subject to any disclaimer, the term of this patent is extended or adjusted under 35 U.S.C. 154(b) by 0 days.

(21) Appl. No.: 11/149,281

(22) Filed: Jun. 10, 2005

(65) Prior Publication Data

US 2005/0275557 A1 Dec. 15, 2005

Related U.S. Application Data

(60) Provisional application No. 60/578,307, filed on Jun. 10, 2004.

(51) Int. Cl.
*G08B 21/00* (2006.01)
(52) U.S. Cl. .............................. 340/686.4; 340/691.7; 340/679; 340/685; 285/12; 285/332.4
(58) Field of Classification Search ............. 340/686.4, 340/666, 679, 686.3, 680, 686.5, 685, 686.6, 340/682, 691.2, 691.7, 687, 686.1; 285/12, 285/328, 333, 332.4, 91
See application file for complete search history.

(56) References Cited

U.S. PATENT DOCUMENTS

| | | | | |
|---|---|---|---|---|
| 4,058,792 A | * | 11/1977 | Soltesz ....................... 340/986 |
| 4,063,482 A | * | 12/1977 | Pizzey et al. ................. 83/207 |
| 4,566,168 A | * | 1/1986 | Stromberg ................... 29/517 |
| 4,573,359 A | * | 3/1986 | Carstensen ................... 73/761 |
| 5,282,653 A | * | 2/1994 | LaFleur et al. .............. 285/110 |
| 5,471,739 A | * | 12/1995 | Fetzer ......................... 29/705 |
| 5,909,904 A | * | 6/1999 | Shea .......................... 285/405 |
| 6,490,939 B1 | * | 12/2002 | Sargent ..................... 73/866.5 |
| 6,748,771 B2 | * | 6/2004 | Nitschmann et al. ......... 68/3 R |

* cited by examiner

*Primary Examiner*—Daniel Wu
*Assistant Examiner*—Daniel Previl
(74) *Attorney, Agent, or Firm*—Birch, Stewart, Kolasch, and Birch, LLP

(57) ABSTRACT

A monitoring system includes a porthole in a tank or conduit that includes threads on an end thereof. A piece of processing equipment is mounted within the porthole by a threaded coupling collar. The threads of the coupling collar engage the threads of the porthole. A sensor collar is mounted in fixed relationship to the porthole at a predetermined distance from an end of the porthole and includes a status sensor mounted thereto. The status sensor detects a position of the threaded coupling collar to ensure that the piece of processing equipment is properly mounted in the porthole.

4 Claims, 7 Drawing Sheets

MONITORING COUPLING STATUS WITH PROCESS LOCKOUT FEEDBACK

CROSS-REFERENCE TO RELATED APPLICATIONS

The present invention claims priority under 35 U.S.C. 119(e) on U.S. Provisional Application No. 60/578,307, filed on Jun. 10, 2004, which is herein incorporated by reference.

BACKGROUND OF THE INVENTION

1. Field of the Invention

The present invention relates to sensors for monitoring whether or not fasteners are sufficiently engaged for safe operation before a process is initiated. In particular, tank portholes that receive pipe connections, probes or other processing equipment are held in place by a clamp, collar or other means. The clamp, collar or other means must be properly physically engaged in order to assure safe operation. An embodiment of the present invention comprises one or more sensors tied or connected to indicators and/or the process control system such that disengaged or improperly/incompletely engaged couplings can be detected before a process is initiated.

2. Description of Background Art

Probes, valves and feed and drain lines can be connected to the ports of pharmaceutical processing equipment tanks using a wide range of couplings. The two most common types of connection systems includes a threaded retaining collar fitted over a flange or shoulder and coupled to mating threads or a pair of mating flanges coupled using bolts or a clamping device. The coupling devices are commonly used because they have been proven both reliable and effective at maintaining the juxtaposition of opposing members and the seal formed between them or by their coupling. If these systems fail, however, the consequences can be very costly in terms of damage to equipment, losses in time and materials and, most importantly, injury to people. As a consequence, significant efforts have been taken to establish SOPs (or "standard operating procedures") that include checking and rechecking for the proper placement of couplings on processing equipment before a process is initiated. Operators are trained and retrained on these procedures and supervisors supervise operators during operations all in an effort to keep all types of failures from occurring, including coupling failures. In spite of these efforts, failures continue to occur.

Recently, a means to assure that couplings, once made, would not fail was sought. However, as mentioned above, the failures that occur are not normally associated with the couplings themselves but, rather, their installation or lack thereof. In fact, it is frequently the failure of the operator to engage the coupling that is the cause of the process leak that occurs. Specifically, in the case of sanitary processing, clamps are placed over flanges but they are not fully engaged. Valves, probes or other equipment are attached to or installed into ports, but the threaded collar or coupling is either not introduced, is present but is not engaged or is not sufficiently engaged. The purpose of the present invention is to give the operator, supervisor or monitor of the process an indication that a coupling is not properly completed or, at least in some cases, may be failing.

SUMMARY OF THE INVENTION

The present invention has been developed to assist an operator by performing a silent check on proper equipment installation. An embodiment of the present invention includes a sensor switch that is mounted in a collar or clamp that can be retrofitted onto an existing port of a vessel or conduit, for example, a probe port. The sensor switch can be used to detect whether a probe, plug, valve, pipe, etc. has been properly secured to the port. An insulated electrical lead can be provided for customization with a range of different electrical connectors.

The sensor switch of the present invention can be hardwired into an existing system in such a way that system startup cannot be initiated until all of the sensor switches in the system are properly secured. Because the system is a passive an unobtrusive system, it does not interfere with normal plant operator or supervisory routines unless a problem is detected. Since the sensor switch system can be tied into an existing process control system, managers can remotely monitor the status of the system.

In the present invention, processing equipment refers to any type of component of a process. For example, processing equipment can include a port of a vessel or conduit, a probe, a plug, a valve, a pipe, etc.

An embodiment of the present invention includes one or more sensors placed within or adjacent to a coupling(s) in such a way that the lack of a coupling(s) or the presence of an inappropriately installed coupling(s) or one that is failing can be detected and the failure results in a means for making this lack of coupling, coupling failure or potential failure known.

According to an embodiment of the present invention, a monitoring system comprises a porthole in a tank or conduit, said porthole including threads on an end thereof; a piece of processing equipment, said piece of processing equipment being mounted within said porthole by a threaded coupling collar, the threads of the coupling collar engaging the threads of the porthole; and a sensor collar, said sensor collar being mounted in fixed relationship to said porthole at a predetermined distance from an end of said porthole and including a status sensor mounted thereto, wherein the status sensor detects a position of the threaded coupling collar to ensure that the piece of processing equipment is properly mounted in the porthole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings.

Figure 1:
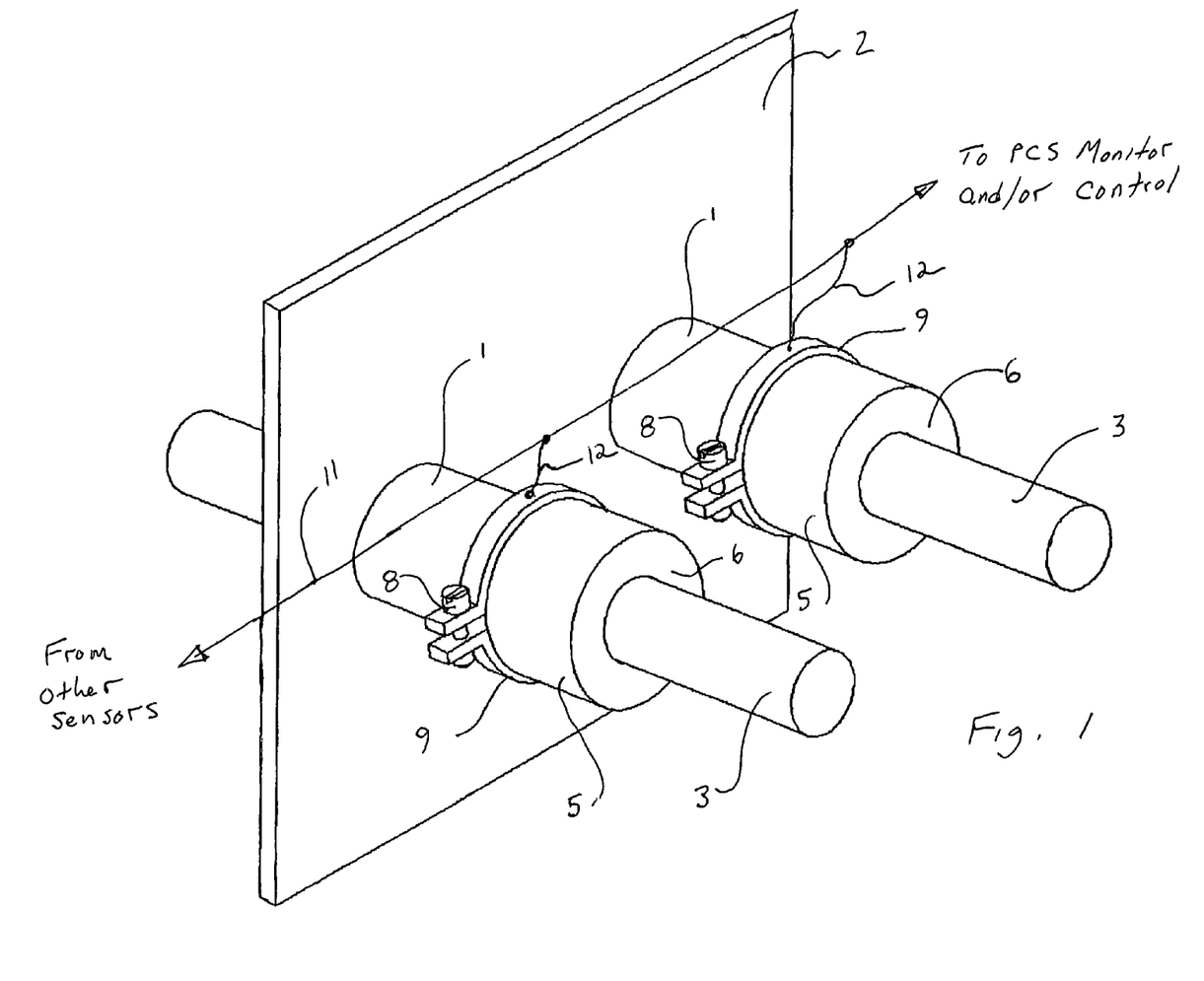
FIG. 1 is an illustration of two portholes including sensors according to the present invention.
Figure 2:
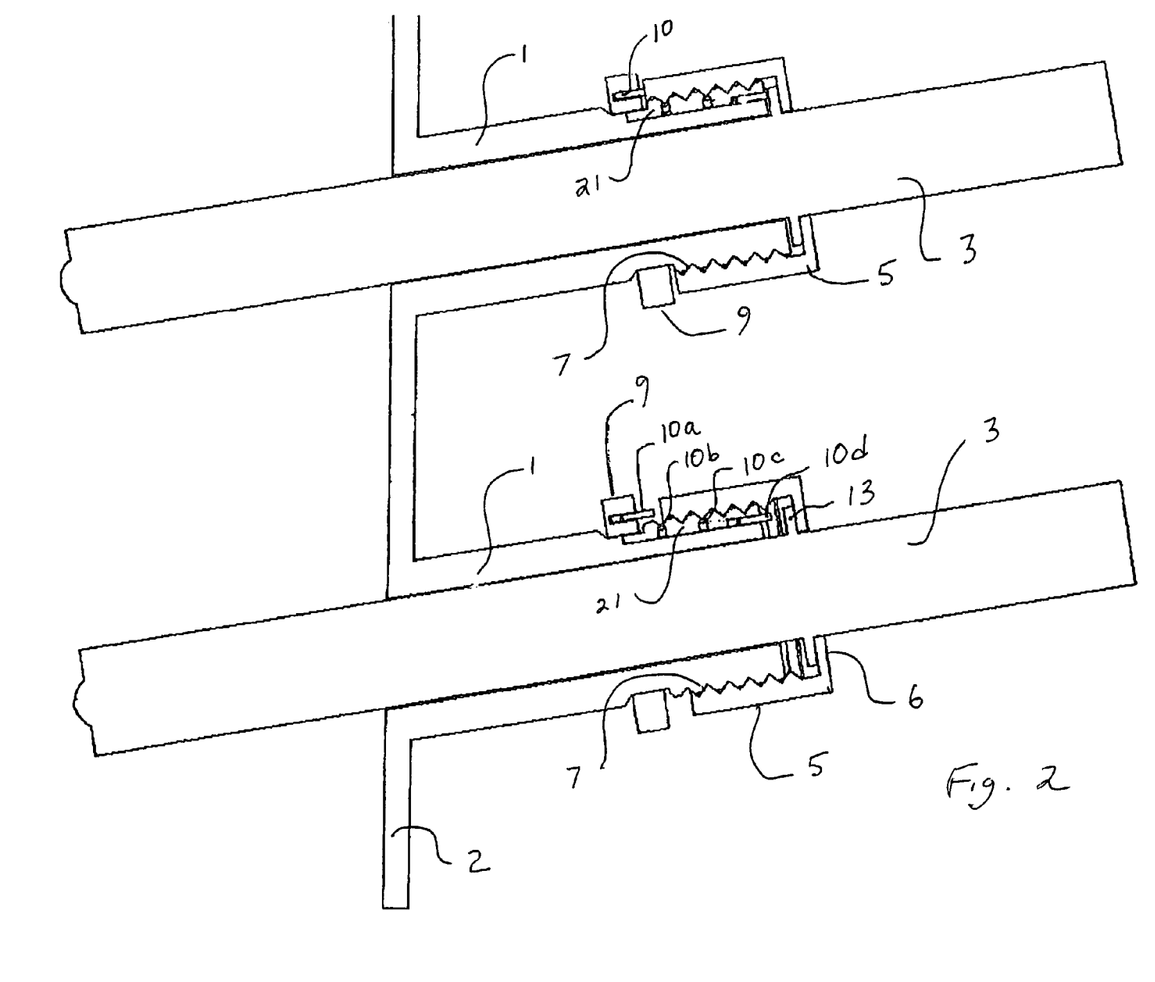
FIG. 2 is a cross-section through the portholes of FIG. 1.

FIGS. 1 and 2 illustrate two portholes 1 next to each other, each with a piece of processing equipment in the form of a process monitoring probe 3 installed and held in place with a threaded coupling collar 5 engaged with the male threads 7 of the porthole 1. A sensor collar 9 is affixed onto each porthole 1 behind the coupling collar 5. Since the coupling collar 5 is threaded forward onto the porthole 1, the coupling collar 5 will engage a status sensor 10 on the sensor collar 9. When the coupling collar 5 engages the status sensor 10 sufficiently to actuate the status sensor 10, the status of the status sensor 10 changes. For example, the status changes from an improperly mounted sensor collar 9 to a properly mounted sensor collar 9.

Sensor collars 9 may be affixed in many ways. For example, FIG. 1 illustrates the sensor collar 9 in the form of a screw clamp with a screw 8 that tightens the sensor collar 9 to the porthole 1 when the screw 8 is tightened. In FIG. 1, two portholes 1 are illustrated as extending out of a tank 2. However, more or less portholes 1 could be provided. In addition, the portholes 1 could be provided in the wall of a conduit (not shown) instead of a tank 2.

Sensor collars 9 may be stringed together to monitor multiple port coupling status. For example, referring to FIG. 1, a wire bus 11 connects multiple sensor collars 9 via respective sensor wires 12. In this way, an entire system can be monitored from a single location.

FIG. 2 is a cross-section through the portholes 1 of FIG. 1. In the lower assembly, sensor 10a, sensor 10b and sensor 10d are not engaged while sensor 10c is engaged. Sensor 10b and sensor 10c change status as the threads of the coupling collar 5 ride over and compress them. Sensor 10a changes status by the coupling collar 5 when the coupling collar 5 is threaded sufficiently onto the porthole 1. Sensor 10d senses the shoulder 13 of the probe 3. While the first three sensors all monitor the position of the coupling collar 5, sensor 10d monitors the actual position of the probe 3 itself. It is possible that if the annular flange 6 of the coupling collar 5 fails, the sensor 10d would detect the event.

It should be noted that sensors may be of a variety of types, from discrete on-off to analog. In addition, one or more of the sensors 10a–10d can be dispensed with, depending on a particular application.

Referring again to FIGS. 1 and 2, one preferred embodiment of the device of the present invention comprises (one or more) sensor(s) 10 installed in a sensor collar 9 that can be installed onto a tank porthole 1 to detect whether or not the coupling collar 5, which is intended to secure a probe 3 in the tank porthole 1, has been properly installed. In this case, the internally threaded annular coupling collar 5 is slipped onto a probe 3 until the annular flange 6 of the coupling collar 5 abuts against the shoulder 13 of the probe 3. The probe 3 is slipped into the tank porthole 1 until the shoulder 13 of the probe 3 abuts against the rear face of the porthole 1. The probe 3 can be securely fixed in place if, at this time, the threads of the coupling collar 5 are sufficiently threaded onto the male threads 7 of the mating porthole 1 so that the annular flange 6 of the coupling collar 5 presses the shoulder 13 of the probe 3 up against the rear face of the porthole 1 from the rear. If the sensor collar 9 is appropriately positioned, the sensor 10a can detect (through contact, interference, proximity or other means) whether or not the coupling collar 5 is engaged and, if engaged, whether it is sufficiently engaged. The sensor 10a, for example, could simply be a switch positioned sufficiently back on the porthole 1 such that the leading edge of the coupling collar 5 can only engage and change the condition of the switch when the coupling collar 5 is sufficiently engaged with the male threads 7 of the porthole 1 to assure that the probe 3 is secure enough for the process to be allowed to go forward.

In FIG. 2, the sensors 10b, 10c and 10d are illustrated as being mounted in a keyway 21 formed in the porthole 1. However, it is also possible to mount the sensors 10b, 10c and 10d in a keyway 21 formed in the threads of the coupling collar 5. In addition, although FIG. 2 illustrates the sensor 10a attached to a sensor collar, it would also be possible to mount the sensor 10a at a predetermined location within a keyway formed in the porthole 1. The sensors can be mounted in their own individual bores formed in the porthole 1, sensor collar 9 or coupling collar 5, depending on a particular application. The sensors also could be formed as molded elements embedded in or protruding from the porthole 1, sensor collar 9 or coupling collar 5. The sensors could be mechanical, electrical, optical, magnet, conductive or other types of sensors that would be known to one having ordinary skill in the art.

With regard to the sensors 10b, 10c and 10d that are mounted within the keyway 21, when the coupling collar 5 does not engage the male threads 7 of the porthole 1 at all, none of the sensors 10b, 10c and 10d would change their condition. If the coupling collar 5 is partially engaged, the states of one or more of the sensors will change and, if the collar is fully engaged, all sensors states will change, including the sensor state of the sensor 10a mounted to the sensor collar 9.

The sensor 10d monitors the position of the probe 3 separately and independently from the condition of the coupling collar 5 on the porthole 1. Specifically, sensor 10d is positioned within the keyway 21 at or adjacent to the end of the porthole 1. The sensor 10d detects contact with and/or proximity with the mating shoulder 13 of the probe 3. If the coupling collar 5 begins to fail or the probe 3 begins to slip out of the porthole 1 under pressure, the change in status can be detected by the sensor 10d.

In FIGS. 1 and 2, the threaded coupling collar 5 is illustrated having a bolt 8 that extends through mating shoulders of the sensor collar 9 to tighten the sensor collar 9 to a porthole 1. It should be understood that there are numerous ways of attaching the sensor collar 9 to a porthole 1. For example, referring to FIGS. 3–8, an alternative sensor collar 9*a* is illustrated. This sensor collar 9*a* includes a bolt 8*a* that is received entirely within the cylindrical body of the sensor collar 9*a* through holes 14*a*. Upon tightening of the bolt 8*a*, the sensor collar 9*a* can be clamped to a porthole 1 at a predetermined location. The sensor collar 9*a* includes a status sensor 10*a* embedded therein in the same manner as the sensor collar 10 of FIGS. 1 and 2.

Figure 7:
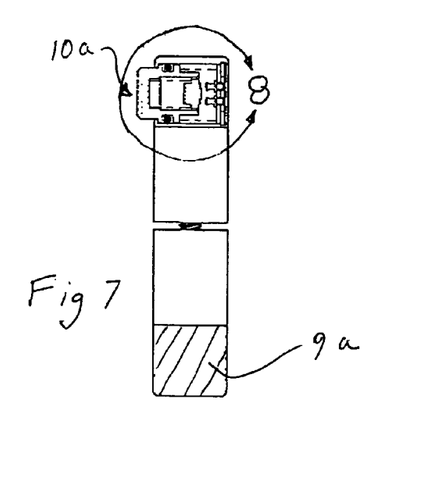
FIG. 7 is a cross-section of the sensor collar of FIG. 6 taken along the line 7—7.
Figure 8:
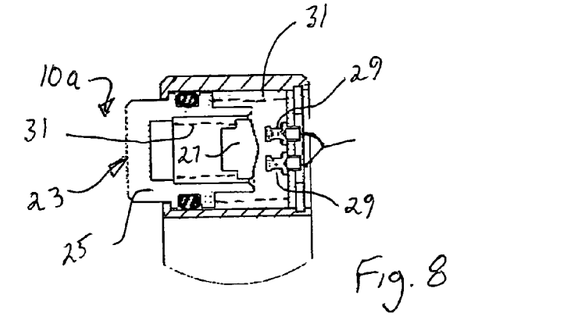
FIG. 8 is a detail of the portion 8 of FIG. 7.

Referring specifically to FIGS. 7 and 8, an embodiment of the status sensor 10*a* of the present invention will be described. The status sensor 10*a* is in the form of a status switch 23. The status switch 23 includes an actuator button 25 that would be engaged by the coupling collar upon movement of the coupling collar toward and away from the sensor collar 9*a*. The actuator button 25 includes a contact 27 mounted for movement therewith. When the actuator button 25 is moved through contact with a coupling collar, the contact 27 engages stationary contacts 29 mounted within the sensor collar 9*a* in order to change the status of the status switch 23. The status switch 23 includes first and second springs 31 for biasing the actuator button 25 to an open position.

Figure 9:
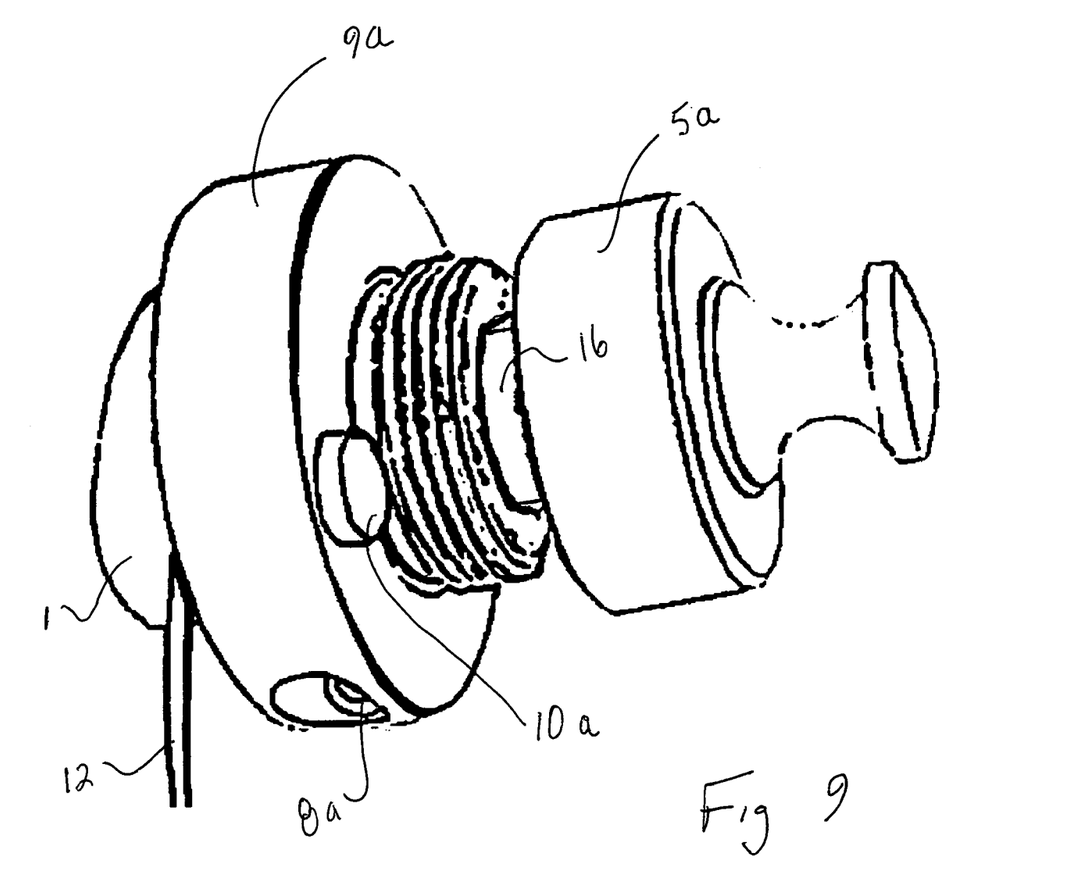
FIG. 9 is an explanatory view of the monitoring device of the present invention with the threaded coupling collar in a detached position with respect to the threads on the porthole.
Figure 10:
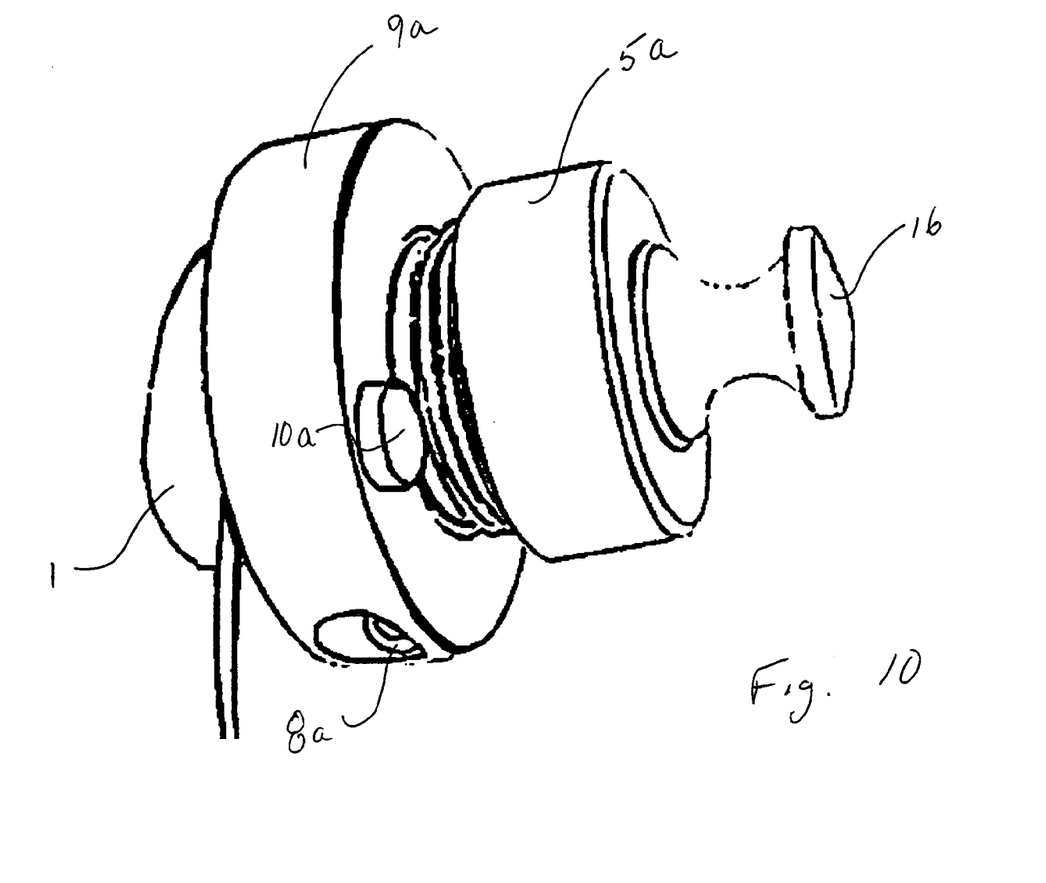
FIG. 10 is an explanatory view of the monitoring device of the present invention with the threaded coupling collar in a partially attached position with the threads on the porthole.
Figure 11:
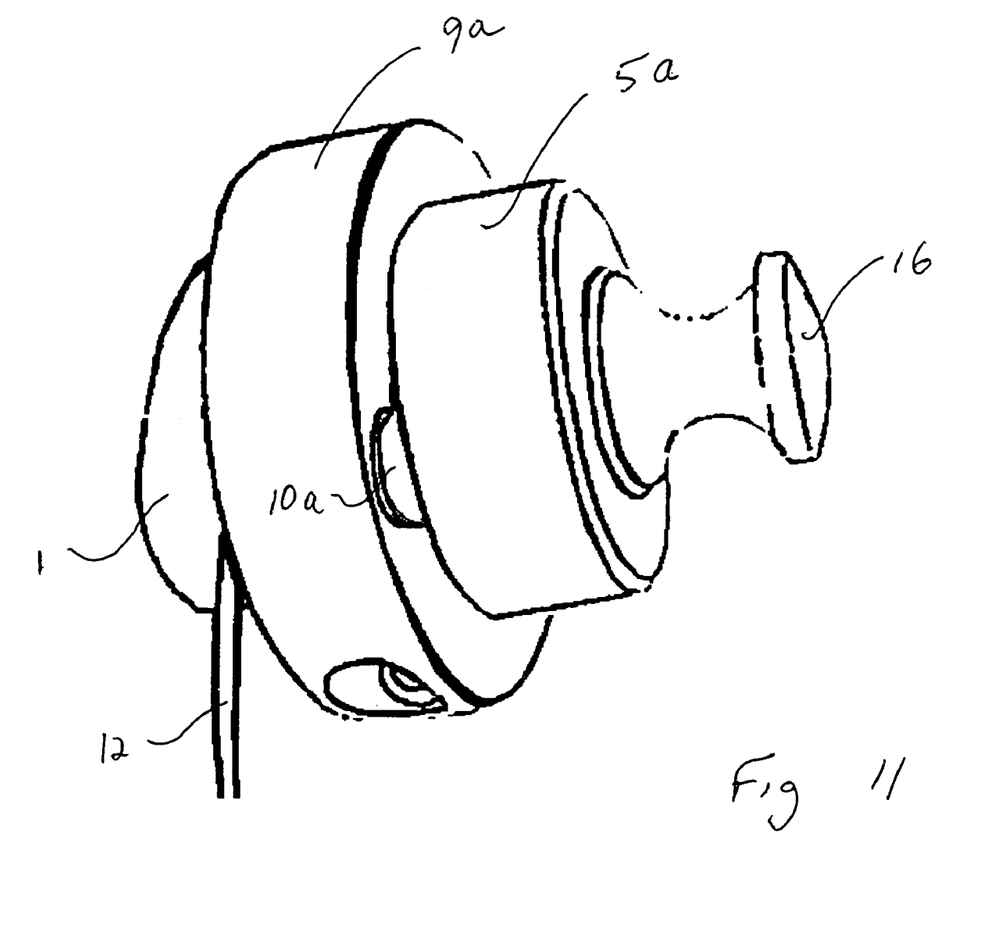
FIG. 11 is an explanatory view of the monitoring device of the present invention with the threaded coupling collar in a completely attached position with the threads on the porthole.

Referring to FIGS. 9–11 of the present invention, a method of operation of the sensor collar 9*a* of the present invention will be described. However, it should be noted that the method is not limited to the sensor collar 9*a* of FIGS. 3–8. The method of the present invention is also applicable to the sensor collar 9 of FIGS. 1 and 2. The sensor collar 9*a* is mounted to the porthole 1 at a predetermined location. In order to determine the proper position of the sensor collar 9*a*, the sensor collar 9*a* is slid over the porthole 1 of a tank 2 (see FIGS. 1 and 2) or conduit (not shown) with the status sensor 10*a* facing away from the tank or conduit. The coupling collar 5*a* is then threaded onto the porthole 1 to secure a piece of processing equipment in the form of a plug 16 thereto. Once it is determined that the plug 16 is properly installed, the sensor collar 9*a* is slid toward the coupling collar 5*a* in order to actuate the sensor 10*a*. The sensor collar 9*a* is then clamped to the porthole 1 at this position by tightening the bolt 8*a* on the sensor collar 9*a*.

It should be noted that this operation is necessary only the first time that the sensor collar 9*a* is mounted to a particular porthole 1. Once this predetermined position is determined, the sensor collar 9*a* would not be moved for typical removal and attachment operations of the processing equipment. Therefore, all future processing equipment assembly can be monitored for proper assembly, as well as failure (in the case of including a sensor 10*d* as in FIG. 2 that engages the processing equipment directly) during future operations without active involvement of the operator.

Referring to FIG. 9, the sensor collar 9*a* is mounted to the porthole 1 at the predetermined position. The coupling collar 5*a* is completely disengaged from the porthole 1. In view of this, the sensor 10*a* is in the disengaged position such that the sensor 10*a* indicates a status of improper installation of the plug 16.

In FIG. 10, the coupling collar 5*a* is partly threaded onto the porthole 1 to secure the plug 16 thereto; however, the coupling collar 5*a* is not sufficiently tightened. In view of this, the sensor 10*a* is still in a disengaged position such that the status sensor 10*a* indicates a status of improper installation of the plug 16.

In FIG. 11, the coupling collar 9*a* is illustrated as being sufficiently tightened to the porthole 1. In view of this, the sensor 10*a* is actuated such that the sensor 10*a* indicates a status of proper installation of the plug 16.

Of course, if a three position sensor were used, if the coupling collar 5*a* were threaded enough to engage the sensor 10*a*, but not tightened enough to actuate the sensor 10*a* completely (a position between FIGS. 10 and 11), the sensor 10*a* would provide a status to indicate that the coupling collar 5*a* was connected, but not sufficiently tightened.

According to another embodiment of the present invention, a coupling collar in the form of a clamp can include a status sensor. The clamp can be positioned on the mating flanges of a port and a pipe or two pipes to detect whether or not the clamp is in place. The status sensor can be placed within the clamp to determine if the clamp is opened or closed and, if closed, whether the clamp is exerting enough compression to properly seal the connection or, conversely, whether the connection is excessively tightened.

Figure 12:
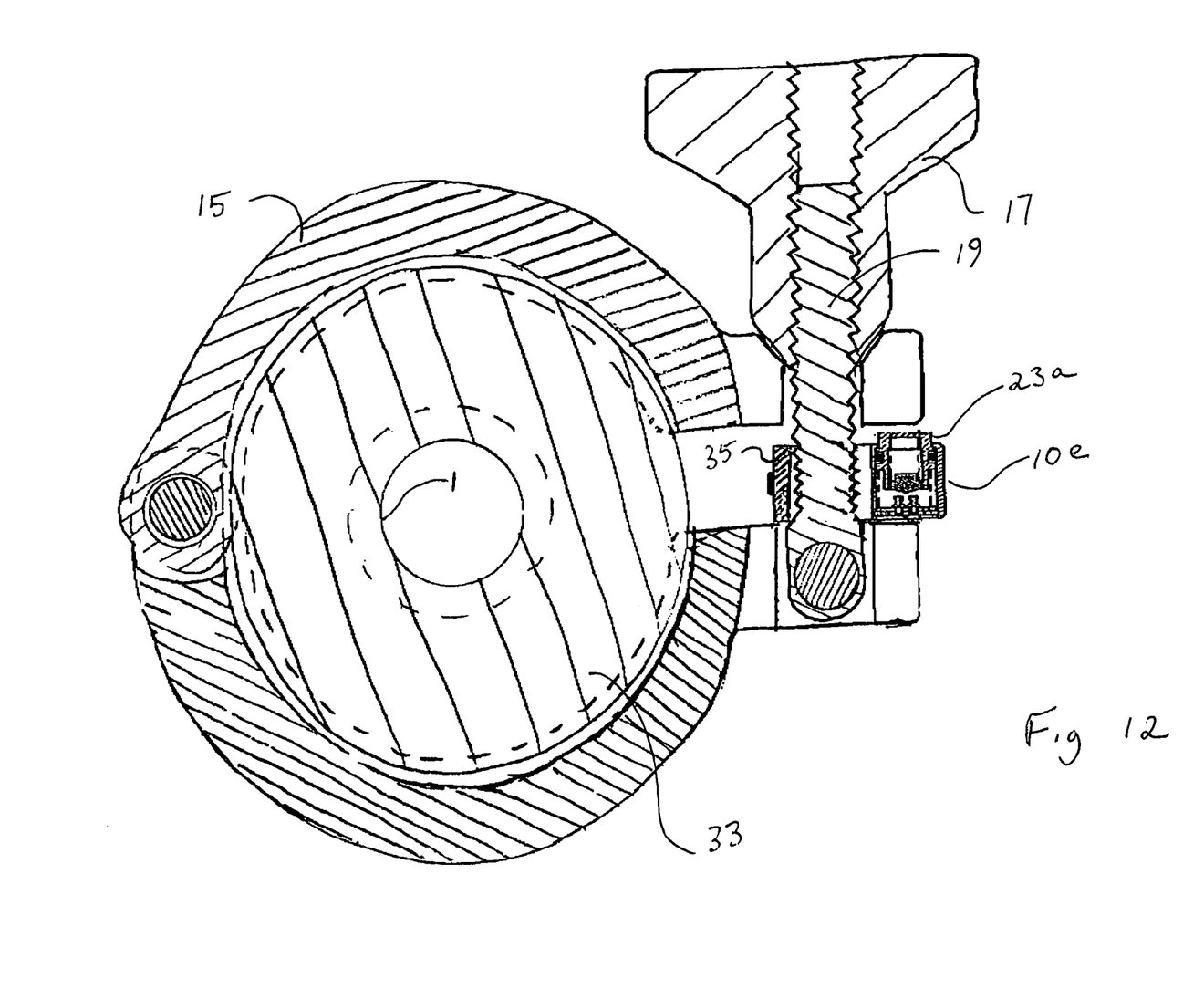
FIG. 12 illustrates a common sanitary clamp.

FIG. 12 depicts an axial view of a common sanitary tri-clamp 15 with the nut 17 engaged on the bolt 19. However, it should be understood that the present invention is not limited to a tri-clamp. The tri-clamp 15 is clamped around a fitting 33, for example, two mating flanges of a port and a pipe or two pipes. A sensor 10*e* is located between the inside edges of the tri-clamp 15, so that as the tri-clamp 15 is tightened, the sensor 10*e* is actuated. The sensor 10*e* can be discrete or analog. Alternatively, a sensor (not shown) can be placed in the bowl of the tri-clamp 15 into which the nut 17 tightens.

Referring to FIG. 12, the sensor 10*e* includes a body 35 that receives a status switch 23*a*. The body 35 also includes a through-hole formed therein for receiving the bolt 19 of the tri-clamp 15. In FIG. 12, the status sensor 10*e* is the same as the status switch 23 described above with regard to FIGS. 7 and 8. However, it should be noted that other sensors could be used as well, as long as a sensor can provide an indication of a status change as the clamp is tightened.

It should be noted that the tri-clamp 15 can include a sensor to detect whether the flanges are present. Such a sensor could be any of the above-mentioned sensors. This application would be usable to ensure that processing equipment is present at a particular location.

It should also be noted that the status sensor 10 could be included between a nut and flange or between a bolt head and flange in bolted flange arrangements. In other words, the bolts used to connect two cooperating bolt flanges could include one or more status sensor 10 mounted around the bolts connecting the flanges together, so that the flange connection monitored in the manner described above. It is also possible that the sensor 10 be mounted between the cooperating flanges, for example, the sensor 10 could be mounted in the flanges in recesses formed in the cooperating faces of the flanges.

In the present invention, one or more sensors could be installed to monitor the condition of a single coupling. Signals from sensors on several different couplings could be connected, combined, run in parallel or in series.

Sensors may be hard-wired to a monitoring/indicator system or they may be monitored using wireless or remote technology. Sensor states themselves could be monitored individually with a local indicator tied to the sensor or, alternatively, the state of a sensor or sensors could be hard-wired for monitoring by the process control system (PCS). The PCS might flag individual couplings if problems were detected. The PCS system might also have a "lock-out" so that tanks with ports whose couplings were flagged as being insufficiently engaged could not be filled or pressurized, thus preventing failures.

Figure 3:
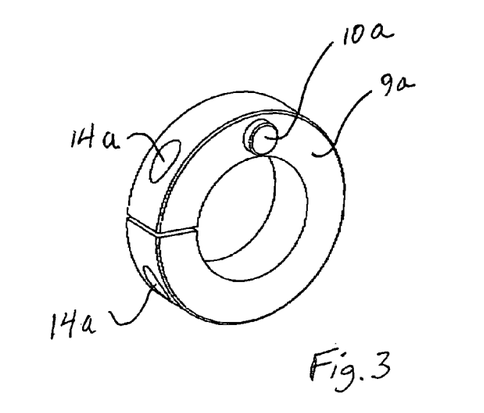
FIG. 3 is a perspective view of an embodiment of the sensor collar of the present invention.
Figure 4:
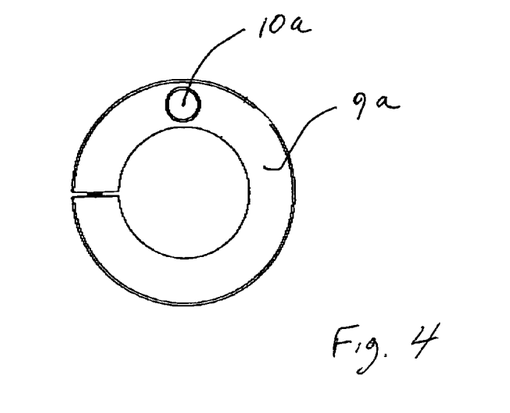
FIG. 4 is a right side view of the sensor collar of the present invention.
Figure 5:
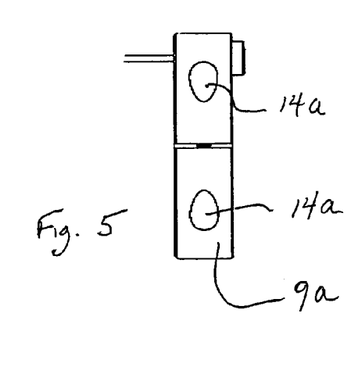
FIG. 5 is a front view of the sensor collar of the present invention.
Figure 6:
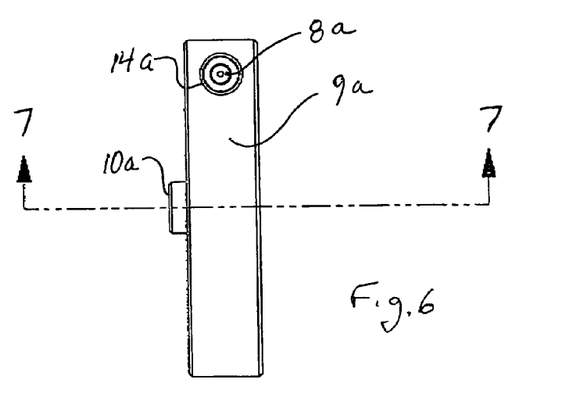
FIG. 6 is a top view of the sensor collar of the present invention.

Although the present invention has been described as being utilized with a probe 3, it should be noted that the present invention can also be used to ensure that other processing equipment is properly mounted in a system. For example, instead of a probe 3, the threaded collar 5 could be used to mount a plug, valve, pipe or other piece of processing equipment to the porthole 1. Therefore, the status sensor 10 would monitor the status of the plug, valve, pipe, etc. instead of a sensor. In addition, the status sensor of the present invention could be mounted between two pipes of a system, preferably taking the form of a clamp as illustrated in FIG. 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A monitoring system, comprising:
    a porthole in a tank or conduit, said porthole including threads on an end thereof;
    a piece of processing equipment, said piece of processing equipment being mounted within said porthole by a threaded coupling collar, the threads of the coupling collar engaging the threads of the porthole; and
    a sensor collar, said sensor collar being mounted in fixed relationship to said porthole at a predetermined distance from an end of said porthole and including a status sensor mounted thereto,
    wherein the status sensor detects a position of the threaded coupling collar to ensure that the piece of processing equipment is properly mounted in the porthole.

2. The monitoring system according to claim 1, wherein the status sensor indicates a status of improper installation of the processing equipment when the threaded coupling collar is not threaded to or improperly threaded to the threads of the porthole, and the status sensor indicates a status of proper installation of the processing equipment when the threaded coupling collar is properly threaded to the threads of the porthole.

3. A method of monitoring a process comprising the steps of:
    mounting a sensor collar to a porthole at a predetermined location from an end of the porthole, said porthole including threads on the end thereof and including a status sensor mounted thereto;
    attaching a piece of processing equipment to the porthole by threading a coupling collar to the threads of the porthole; and
    tightening the coupling collar to the porthole until the coupling collar actuates the status sensor on the sensor collar,
    wherein the status sensor detects a position of the coupling collar to ensure that the processing equipment is properly mounted to the porthole.

4. The method according to claim 3, wherein the status sensor provides an indication that the processing equipment is improperly installed when the coupling collar does not actuate the status sensor or actuates the sensor an insufficient amount, and said status sensor provides an indication that the processing equipment is properly installed when the coupling collar sufficiently actuates that sensor.

* * * * *